United States Patent [19]
Lima et al.

[11] Patent Number: 5,361,689
[45] Date of Patent: Nov. 8, 1994

[54] METHOD AND APPARATUS FOR BLANCHING NUTS

[75] Inventors: Paul G. Lima, Fort Worth; John M. Singleton, Trophy Club, both of Tex.

[73] Assignee: Cantrell International, Fort Worth, Tex.

[21] Appl. No.: 136,338

[22] Filed: Oct. 14, 1993

[51] Int. Cl.⁵ .......... A23N 5/00; A23N 5/01; A23N 12/00
[52] U.S. Cl. .................. 99/575; 99/519; 99/523; 99/585; 99/618; 99/620; 99/621; 99/625; 99/628; 426/483
[58] Field of Search .......... 99/518, 519, 520, 523, 99/524-526, 601, 585, 617-625, 609-612, 628; 426/481, 482, 483

[56] References Cited

U.S. PATENT DOCUMENTS

| | | |
|---|---|---|
| 1,264,329 | 4/1918 | Pike . |
| 1,842,909 | 1/1932 | Lewinski ............... 99/623 |
| 2,143,020 | 1/1939 | Markley et al. ....... 99/628 |
| 2,699,806 | 1/1955 | Gardner ................. 99/576 |
| 4,173,177 | 11/1979 | Davis . |
| 4,432,275 | 2/1984 | Zerkert et al. . |
| 4,643,086 | 2/1987 | Christodoulou . |
| 5,024,148 | 6/1991 | Moses . |

Primary Examiner—Timothy F. Simone
Attorney, Agent, or Firm—Mark W. Handley

[57] ABSTRACT

Two counter rotating rollers are provided having elastomeric exterior coatings into which ribs and grooves are formed for intermeshing to blanch nuts at a pinch point therebetween. Grooves in the lower roller hold nuts as ribs on the upper roller pass across the nuts to break skins on the nuts. The elastomeric exterior coatings have surface hardness values which measure around 30 durometer. The squeeze at the pinch point between the two rollers can be repeatably adjusted for running different sizes of nuts.

21 Claims, 2 Drawing Sheets

METHOD AND APPARATUS FOR BLANCHING NUTS

BACKGROUND OF THE INVENTION

1. Field of the Invention

The present invention relates in general to a method and apparatus for removing skins from nuts, and more particularly to a method and apparatus for blanching different sizes of peanuts.

2. Description of the Prior Art

Various prior art devices have been used for blanching nuts. One such prior art device is the nut blanching apparatus shown in U.S. Pat. No. 4,432,275, issued to Zekert et al., the disclosure of which is hereby incorporated by reference. Zekert et al. discloses counter-rotating rollers, between which nuts are passed between two opposing sets of hollow elastic tubular rings moving at slightly different speeds for removing skins from nut meat. Zekert et al. further discloses various other prior art devices for blanching nuts, the disclosure of which is hereby incorporated by reference.

Prior art blanching devices typically apply a combination of pressure and abrasion to remove the skins from nuts. When insufficient pressure is applied to the nuts, more will pass through a nut blanching device without having the skin removed. Application of excessive pressure causes the nuts to split, and thus reduces the yield rate of whole nuts. Excessive abrasion of the nuts creates excessive fines, which are the powdered particulates which result from grinding off a portion of the nut meat from nuts as they are processed. In some cases, excessive pressure acting with excessive abrasion can also split nuts. Whole nuts sell for more than split nuts. Also, nuts are typically sold by weight, so excessive fines reduces the price for a batch of processed nuts.

Additionally, nuts come in various and assorted sizes for particular types of nuts. Wide ranges of sizes for particular types of nuts are typically processed, often requiring excessive component adjustment and changing of components for prior art nut blanching equipment. A high degree of control, with repeatable control parameters and adjustments, is required for blanching nuts over a large range of nut sizes to have a high yield rate. Higher yield rates for blanched whole nuts are obtained by removing the skins from a high percentage of nuts, reducing the amount of fines, and reducing the amount of nuts which are split.

SUMMARY OF THE INVENTION

It is one object of the present invention to provide a method and apparatus for processing a large range of sizes of nuts to remove skins from nut meats.

It is another object of the present invention to provide a method and apparatus for blanching nuts which is operable in either a whole nut blanching mode or a split nut blanching mode.

It is yet another object of the present invention to provide a method and apparatus for processing a wide range of nut sizes to remove skins from nut meat, such method and apparatus being repeatably adjustable for accurately processing different ranges of nut sizes.

It is still another object of the present invention to provide a method and apparatus for blanching whole nuts in a process having a high yield rate which yield rate is obtained by blanching a high percentage of the nuts, reducing the amount of nuts which are split, and reducing the amount of fines.

These objects are achieved by means of a method and apparatus for blanching nuts which have been preconditioned for blanching. The nuts are fed into a feed means for passing to a roller assembly in a parallel feed alignment. The roller assembly includes an upper roller having a resilient exterior, preferably formed from a natural or synthetic elastomeric material meeting F.D.A. regulations for food processing equipment. The resilient exterior of the upper roller has a plurality of circumferentially extending teeth which include crests and roots which alternatingly extend laterally across the upper roller. The crests include flattened regions which define a plurality of laterally spaced ribs extending in circumferential fashion about the upper roller exterior.

The roller assembly also has a lower roller with a resilient exterior preferably formed from a natural or synthetic elastomeric material meeting F.D.A. regulations for food processing equipment. The resilient exterior of the lower roller also has a plurality of cicumferentially extending teeth which include crests and roots which alternatingly extend laterally across the roller exterior. The roots of the lower roller teeth define a plurality of laterally spaced grooves extending in circumferential fashion about the lower roller exterior.

A frame is provided for supporting the upper and lower rollers in parallel alignment with the ribs of the upper roller being radially aligned with the grooves of the lower roller to define pinch points. A drive means counter-rotates the upper roller and the lower roller so that nuts are received into and held in place by the grooves in the lower roller while the flattened regions of the laterally spaced ribs of the upper roller wipe across the nuts at the pinch points to remove the skins therefrom.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
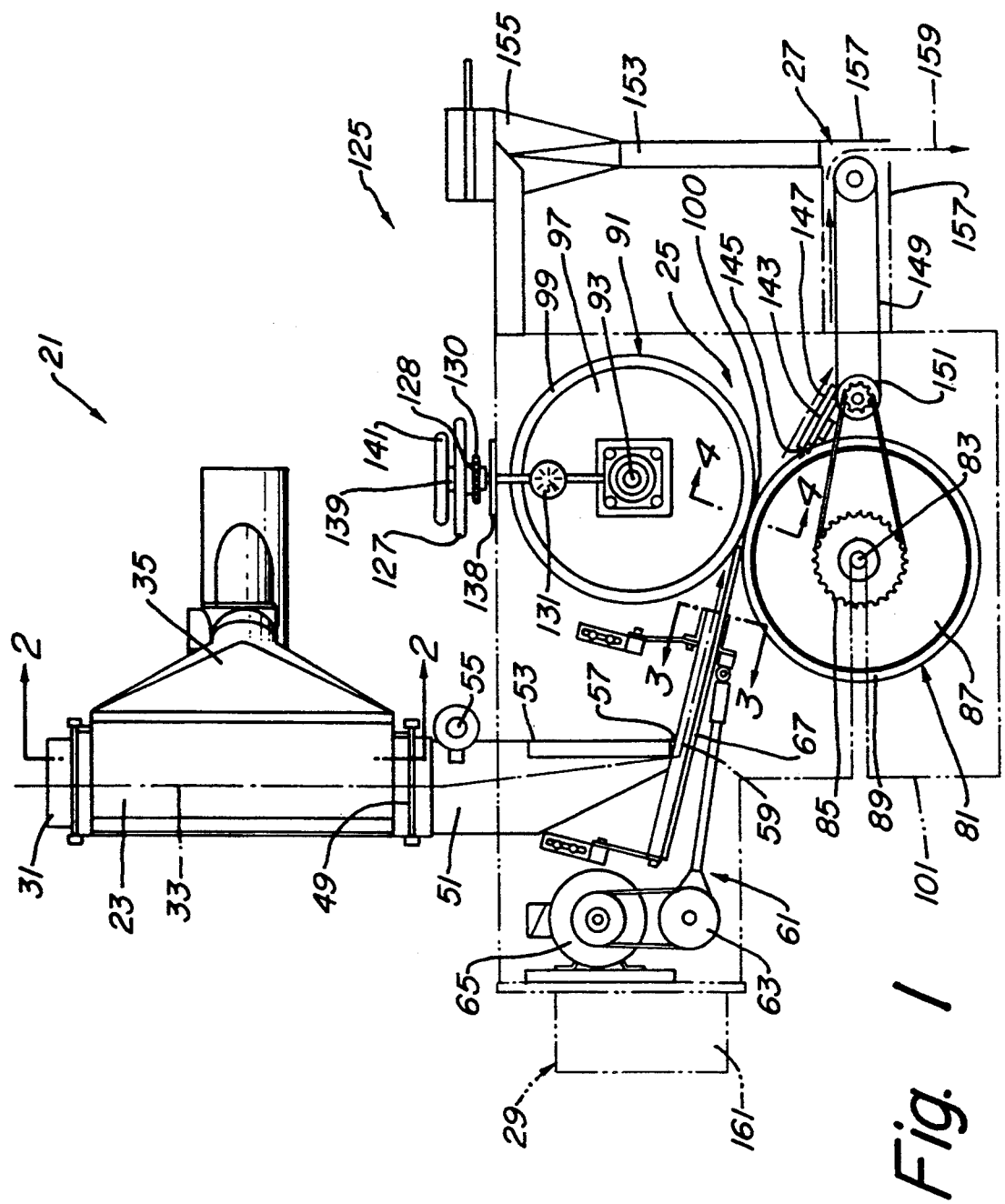
FIG. 1 is a side, elevational view of a nut blancher according to the present invention showing the operative components thereof.

Referring to FIG. 1, a side, elevational view depicts nut blancher 21, of the preferred embodiment of the present invention, which is for blanching, or removing the skins, from peanuts. Nut blancher 21 includes feed means 23, roller assembly 25, discharge means 27, and motive means 29, of which a portion is shown in FIG. 1.

Feed means 23 includes feed inlet 31 and pre-aspiration module 33. Air ducting 35 is provided for drawing air through pre-aspiration module 33. In the preferred embodiment of the present invention, 800 cubic feet per minute of air is drawn through pre-aspiration module 33 to collect skins which may exist loose within the product feed and carry them to a fan and cyclone collector.

Figure 2:
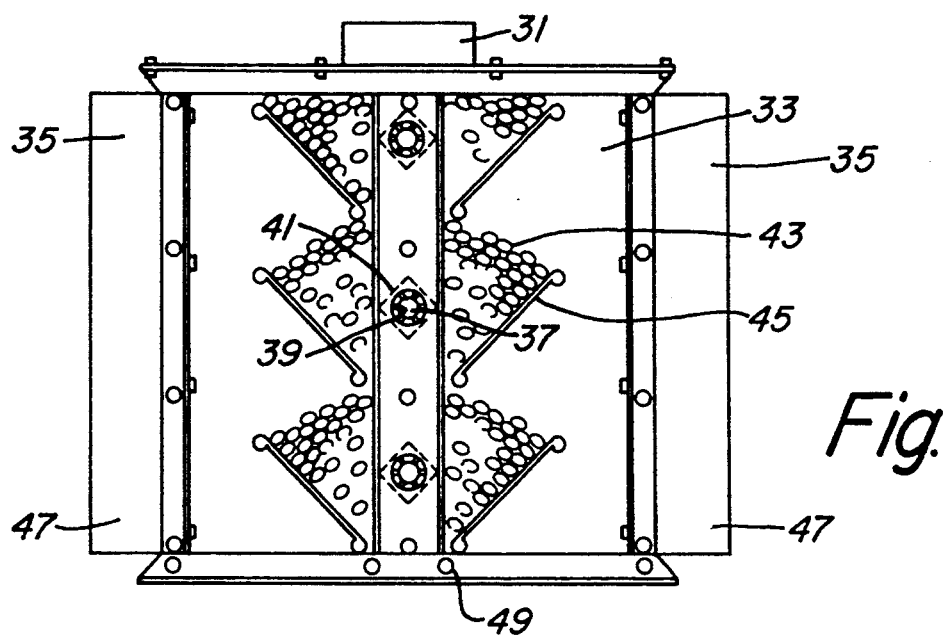
FIG. 2 is a sectional view of a flooded feed, preaspiration module of the preferred embodiment of the present invention taken along section line 2—2 of FIG. 1, and has been rotated ninety degrees for orienting this sectional view in accordance with the vertical direction.

Referring now to FIG. 2, a sectional view taken along section line 2—2 of FIG. 1, and rotated ninety degrees for orienting the sectional view in the vertical direction, depicts pre-aspiration module 33 of feed means 23. Pre-aspiration module 33 includes air inlets 37 for drawing ambient air into nut blancher 21 for passing through pre-aspiration module 33. Ambient air passes through air inlets 33, into air inlet tubes 39, and through apertures 41 for aspirating product 43 to remove loose skins therefrom. As shown in FIG. 2, pre-aspiration module 33 provides a flooded feed pre-aspirator. Product 43, which are peanuts in the preferred embodiment of the present invention, are stacked on top of plates 45 for passing downward through pre-aspiration module 33. Air exhaust 47 is connected to air ducting 35 for pulling air through air inlets 37, air inlet tubes 39, apertures 41, and product 43 for removing loose skins therefrom. Pre-aspiration module 33 includes product discharge 49 for passing product 43 downward to the rest of feed means 23.

Referring again to FIG. 1, feed hopper 51 is provided below pre-aspiration module 33. Feed hopper 51 includes feed gate 53, which in the preferred embodiment of the present invention is a solid steel plate. Gate control knob 55 is provided for adjusting a feed rate control gap by raising and lowering feed gate 53 to control the amount of product 43 passing through feed hopper 51 and onto feed tray 59.

Grooved feed tray 59 is connected to shaker assembly 61 for reciprocating feed tray 59. Shaker assembly 61 includes pulley 63 and drive motor 65, which is a portion of motive means 29. Feed tray 59 is reciprocated by shaker assembly 61 to move product 43 onto a grooved portion 67 of feed tray 59. Movement of product 43 on grooved portion 67 of feed tray 59 both aligns individual nuts of product 43 to be grouped on grooved portion 67 in a parallel feed alignment, and orients each nut of product 43 to extend in a particular direction.

Figure 3:
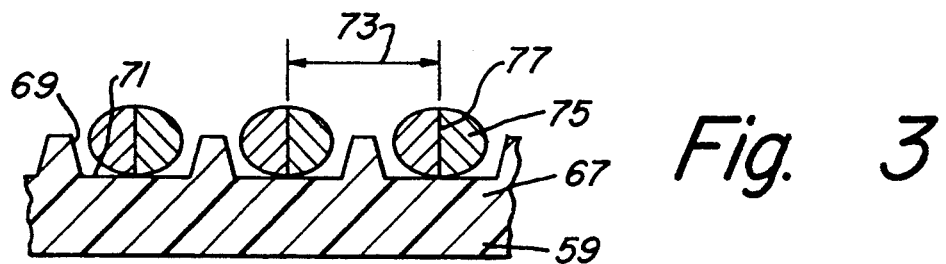
FIG. 3 is a sectional view of the grooved portion of the feed tray of the shaker assembly of the preferred embodiment of the present invention, taken along section line 3—3 of FIG. 1 and rotated ninety degrees for orienting this sectional view in accordance with the vertical direction.

Referring to FIG. 3, a sectional view taken along section 3—3 of FIG. 1 and rotated ninety degrees for orienting this sectional view in accordance with the vertical direction, depicts grooved portion 67 of feed tray 59. Grooved portion 67 includes grooves 69, three of which are shown, for arranging nuts 75 of product 43 in a side-by-side, parallel feed alignment 73 in separate grooves 69. Only a portion of product 43 which extends in parallel feed alignment 73 is shown in FIG. 3.

Grooved portion 67 of feed tray 59 also includes flats 71 in grooves 69 for orienting product 43 with splits 77 in the vertical direction. FIG. 3 views nut 75 of product 43 from a direction looking down the longitudinal length of nut 75, with the width of nut 75 shown in this sectional view. Nut 75 includes split 77 which separates the two halves of nut 75. Grooved feed tray 59 and shaker assembly 61 operate to orient split 77 so that it is in a vertical direction for feeding into roller assembly 25. The width is fed into roller assembly 25, with the length of nut 75, which is the longer direction across the nut, extending away from roller assembly 25 as nut 75 is fed therein.

Referring again to FIG. 1, roller assembly 25 includes lower roller 81 having shaft 83, and gear 85 mounted to shaft 83. Lower roller 81 has an outer diameter of around 17 inches, and laterally extends, in a longitudinal direction, for around 24 inches. Lower roller 81 includes a steel cylinder, or roller, 87 providing an interior, and a resilient, or rubberlike, exterior 89 provided by vulcanizing an elastomeric material around exterior steel cylinder 87. Resilient exterior 89 has teeth 102 formed exteriorly therein which define crests 109 and roots 107 which alternate laterally across resilient exterior 89 of upper roller 81, as discussed below in reference to FIG. 4. Resilient exterior 89 has an overall thickness of around ⅜ inches.

Resilient exterior 89 may be formed from a natural or synthetic elastomer having a hardness ranging from 24 to 50 durometer, and which meets F.D.A. regulations for food processing equipment. In the preferred embodiment of the present invention, resilient exterior 89 is formed from neoprene and has surface hardness values of around 30 durometer. Hardness values above 50 durometer typically begin to create fines, which are powdered particulates which are removed from nut meat as product 43 is processed.

Roller assembly 25 further includes upper roller 91 having a shaft 93 to which is mounted a gear box 95 (not shown). Upper roller 91 has an outer diameter of around 17 inches, and laterally extends, in a longitudinal direction, for around 24 inches. Upper roller 91 has a steel cylinder 97, or roller, providing an interior, and resilient, or rubberlike, exterior 99 provided by vulcanizing an elastomeric material around exterior steel cylinder 97. Resilient exterior 99 has teeth 112 formed exteriorly therein which define crests 121 and roots 119 which alternate laterally across resilient exterior 99 of upper roller 91, as discussed below in reference to FIG. 4. Resilient exterior 99 has an overall thickness of around ⅜ inches.

Resilient exterior 99 may formed from a natural or synthetic elastomer having a surface hardness ranging from 24 to 50 durometer, and which meets F.D.A. regulations for food processing equipment. In the preferred embodiment of the present invention, resilient exterior 99 is formed from neoprene and has surface hardness values of around 30 durometer. As discussed above for roller resilient exterior 89, hardness values above 50 durometer typically begin to create fines when used for blanching peanuts.

Lower roller 81 and upper roller 91 converge to define pinch points 100, through which product 43 is passed for removing the skins therefrom. Frame 101 provides a housing and support means for holding the various components of nut blancher 21 in a proper arrangement. Shaft 83 and shaft 93 are secured within bearings for rotating lower roller 81 and upper roller 91 within frame 101.

Figure 4:
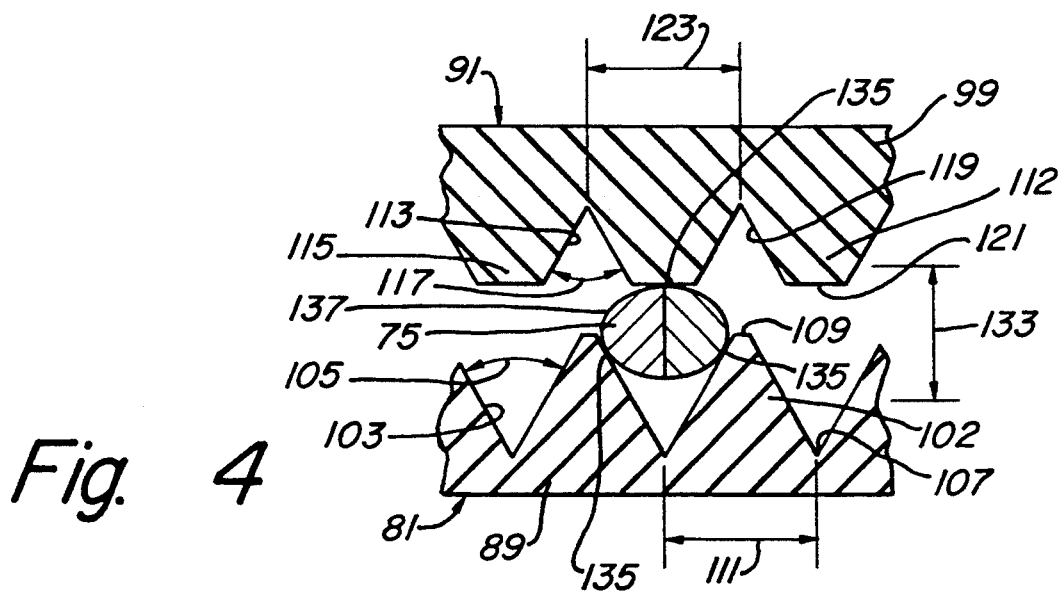
FIG. 4 is a sectional view of the rubber-like exteriors of the upper and lower rollers taken along section line 4—4 of FIG. 1, and rotated ninety degrees for orienting this sectional view in accordance with the vertical direction.

Referring now to FIG. 4, a section view taken along section line 4—4 of FIG. 1 and oriented ninety degrees to present the view in accordance with the vertical, depicts resilient exteriors 89 and 99 of lower roller 81 and upper roller 91, respectively. Teeth 102 circumferentially extend around lower roller 81. Teeth 102 are provided by cutting grooves 103 into resilient exterior 99. Teeth 102 have sidewalls disposed at an angle 105, which in the preferred embodiment of the present invention is sixty degrees. Grooves 103 have roots 107 and crests 109. The distance across the grooves at the crest ranges from 0.484 inches to 0.516 inches. Pitch 111 between grooves 103 is approximately ⅜ of an inch.

Teeth 112 circumferentially extend around upper roller 91. Teeth 112 are formed by cutting grooves 113 into resilient exterior 99 to provide ribs 115 for aligning with roots 107 at pinch points 100. Teeth 112 have an angle 117 between side walls which is equal to sixty degrees in preferred embodiment of the present invention. Teeth 112 have root 119 and crest 121. Pitch 123 for grooves 113 is ⅜ inches in the preferred embodiment of the present invention so that ribs 115, formed by grooves 113, will have the same pitch as grooves 103.

Still referring to FIG. 4, it should be noted that according to the present invention, roller assembly 25 may be adjusted so that grooves 103 intermesh with grooves 113 at pinch points 100. In operation for blanching nuts, crest 121 of ribs 115 are radially aligned with root 107 of grooves 103. Radially aligned, as used herein, is defined to refer to aligning root 107 and grooves 103 along a radius of upper cylindrical roller 81 or lower cylindrical roller 91, at pinch points 100. When product 43 is run between resilient exterior 89 and resilient exterior 99 at pinch points 100, contact points 135 are provided by crest 121 of ribs 115 and grooves 103. Grooves 103 will hold product 43, such as for example, nut 75 as shown being held within groove 103, as rib 115 passes over nut 75 along split 77 to break the skin of nut 75. In the preferred embodiment of the present invention, contact points 135 of grooves 103 contact nut 75 at two places 120 degrees apart. These two contact points 135 of grooves 103 with nuts 75 hold nuts 75 in place as crest 121 of ribs 115 wipe across nut 75 for breaking skins 137.

Referring to FIGS. 1 and 4, gap control assembly 125 is provided for controlling the clearance, or squeeze 133, between lower roller 81 and upper roller 91 at pinch points 100. Squeeze 133 is herein defined as the distance between lower roller 81 and upper roller 91, and determines the amount of pressure which is applied to product 43 in passing between lower roller 81 and upper roller 91 of roller assembly 25. Micrometer 131 is provided for repeatably measuring squeeze 133 between the relative distance between lower roller 81 and upper roller 91 at pinch points 100.

Gap control assembly 125 includes gap adjustment knob 127 for controlling squeeze 133 between lower roller 81 and upper roller 91 at pinch points 100. Rotating gap adjustment knob 127 in one rotational direction will increase squeeze 133, and rotating knob 127 in the opposite direction will decrease squeeze 133. Micrometer 131 provides a repeatable reading of squeeze 133.

Referring to FIG. 1, gap control assembly 125 includes bolt 139 and bolt 140 (not shown) which are secured within frame 101 on opposite lateral ends of upper roller 91. Shaft 93 of upper roller 91 is journalled within bracket 138, which is moveable along bolts 139 and 140 (not shown) by rotating gap adjustment knob 127. Gap adjustment knob 127 is fixed to sprocket 128, which is threadingly secured to bolt 139 for rotating on bolt 139 to move in either an upwards or downwards direction on bolt 139 depending on the direction of rotation.

Chain 130 extends between sprocket 128 and sprocket 129 (not shown), which rotates on bolt 140 (not shown) to advance along bolt 140 (not shown) the same distance and direction that sprocket 128 advances along bolt 139 when knob 127 is rotated. Sprocket 128 and sprocket 129 (not shown) are journalled within bracket 138 for moving upper roller 91 within frame 101, and with respect to roller 81, while maintaining shafts 83 and 93 in parallel alignment. Lock nut 141 is provided for locking against gap adjustment knob 127 to lock knob 127 and sprocket 128 against rotation, and thus linear travel, with respect to bolt 139. Lock nut 142 (not shown) is provided for locking against sprocket 129 (not shown) to prevent rotation and linear travel with respect to bolt 140 (not shown). Lock nuts 141 and 142 (not shown) lock upper roller 91 in position with respect to lower roller 81 once the proper squeeze has been attained.

Adjustment of gap adjustment knob 127 will move upper roller 91 with respect to lower roller 81, as micrometer 131 provides a repeatable indication of squeeze 133 between lower roller 81 and upper roller 91. In the preferred embodiment of the present invention, the squeeze is set so that crest 121 of ribs 115 barely touch the surface of nut 75 to break open skins 137. Micrometer 131 provides a repeatable reading for determining squeeze 133 for various sizes of nuts. It should be noted however that the amount of squeeze 133 required for a particular range of sizes of nuts, as well as the percentage of acceptable nuts, will vary depending upon the preconditioning of product 43 prior to running through nut blancher 21.

Nut blancher 21 may be utilized for processing assorted sizes of nuts, without changing either upper roller 91 or lower roller 81. Adjustments for processing batches of various sizes of nuts within a grade, or range of nut sizes, may be accomplished by adjusting gap control assembly 125 for setting squeeze 133. Micrometer 131 provides a measurement means for determining squeeze 133. Micrometer 131 is zeroed when upper roller 91 is lowered to where it just touches lower roller 81 and then may be used to provide a reading for indicating squeeze 133 which is repeatable and reliable. Gap control assembly 125 may be operated for setting squeeze 133 by moving adjustment knob 127 until micrometer 131 reads a predetermined value. This predetermined value may be determined empirically for various ranges of sizes of nuts, if other nut processing parameters are held constant, such as those controlling nut drying. Since ribs 115 can extend into grooves 103, to intermesh grooves 113 into grooves 103, squeeze 133 between resilient exterior 89 and resilient exterior 99 can be varied for a large range of nut sizes.

Still referring to FIG. 1, nut rake 143 is provided with rake fingers 145 which extend into grooves 103 (shown in FIG. 4) for removing product 43 from lower roller 81. In the preferred embodiment of the present invention, rake fingers 145 are formed from nylon. Nuts pass from rake fingers 145, through discharge tray 147, into discharge conveyor 149. Discharge conveyor 149 has a discharge conveyor gear 151 which is coupled to gear 85 of lower roller 81 so that they will be operating at similar speeds for removing product 43 on conveyor 149 so that product 43 is at a one layer bed depth. Discharge aspirator 153 is provided for removing the skins 137 from product 43 as product 43 passes from discharge conveyor 149. Discharge air ducting 155 is provided for transporting the discharged air for aspirating product 43, and skins 137 contained therein, to a fan and cyclone collector. The preferred embodiment of the present invention, 800 cubic feet per minute of air is required for operating discharge aspirator 153.

Discharge flaps 157 are provided for collecting product 143 until a certain amount is built up then opening to discharge product 43 through blancher discharge 159. Discharge flaps 157 are formed from food grade conveyor belting in the preferred embodiment of the present invention. Discharge flaps 157 reduce the distance which product 43 drops in passing from discharge conveyor 147, through blancher discharge 159, and to subsequent processing means which are exterior of nut blancher 21. As a rule of thumb, discharge flaps 157 prevent product 43 from falling a distance which exceeds 4 inches, which may cause splitting of whole nuts.

Motive means 29 includes variable speed controllers 161, of which three are utilized in the preferred embodiment of the present invention. Motive means 29 further includes three drive motors, one of which is shown in FIG. 1 as drive motor 65 for providing a motive means for shaker assembly 61. Two other electric motors are utilized in the preferred embodiment of the present invention, one for driving gear 85 which rotates lower roller 81, and another for driving gear box 95 which rotates upper roller 95. Gear 85 additionally rotates discharge conveyor gear 151 to drive discharge conveyor 149.

In the preferred embodiment of the present invention, lower roller 81 is driven at nine (9) revolutions per minute, and upper roller 91 is driven at twelve (12) revolutions per minute. As viewed in FIG. 1, lower roller 81 rotates clockwise, and upper roller 91 rotates counter-clockwise so that resilient exterior 99 will move slightly faster than resilient exterior 89 at pinch points 100. These speeds may of course be varied for different product throughput and for different nut conditions. In the preferred embodiment of the present invention, speeds are controlled by three variable speed controllers 161 having integral tachometers.

Operation of nut blancher 21 is now described. Product 43 is preconditioned prior to passing through nut blancher 21. Preconditioning includes removing shells, and heating to dry product 43 and loosen skins 137. Product 43 then passes into nut blancher 21 through feed means 23. After passing through feed inlet 31, product 43 goes into pre-aspiration module 33 for removing loose skins. It should be noted that pre-aspiration module 33 and feed hopper 51 are flooded feed units, meaning they are filled with product 43. Product 43 then passes into feed hopper 51 and through feed gate 53. Gate control knob 55 is used to control feed rate control gap 57, which determines amount of product 43 passing onto grooved feed tray 59 and shaker assembly 61. Shaker assembly 61 aligns nuts 75 for passing downward on feed tray 59 to grooved portion 67 for presenting to roller assembly 25 in parallel feed alignment 73, and orienting splits 77 vertical and orthogonal to lower roller 81 and upper roller 91.

Referring to FIG. 2, product 43 gravity feeds into preaspiration module 33 for passing downward to the various plates 45, and air is drawn through air inlets 37, inside inlet tubes 39, out apertures 41, through product 43, and out air exhaust 47. Air passing through aspiration module 33 removes loose skins from product 43.

Referring to FIG. 4, grooves 103 are spaced apart by pitch 111 to match the parallel feed alignment 73 for accepting product 43 from grooved portion 67 of feed tray 59 in parallel feed alignment 73, and with splits 77 oriented in the vertical direction. Groove 103 then carries product 43 to pinch points 100 for engaging with ribs 115 of upper roller 91. Crests 121 of ribs 115 gently brush, or wipe across, the top of product 43 and cause skins 137 to be broken. Grooves 103 of lower roller 81 then carry product 43 to rake fingers 145, which dislodge product 43 for discharge onto discharge tray 147. Product 43 then passes to discharge conveyor 149 and through discharge aspirator 153 for drawing off skins from product 43. Product 43 then falls onto discharge flaps 157 until a large enough weight of product 43 builds up to push discharge flaps 157 open, which drops product 43 therethrough for passing onto processing equipment which is exterior of nut blancher 21.

Nut blancher 21 may be operated in either a whole nut blanching mode or a split nut blanching mode, depending on squeeze 133. Nut blancher 21 is operated in split nut blanching mode by decreasing squeeze 133, and increasing the speed of roller 91 with respect to values used for operating split nut blancher 21 in whole nut operating mode. Split nut operating mode is achieved by tightening gap control adjustment knob 127 to reduce squeeze 133 to apply pressure to product 43 as it passes between upper roller 91 and lower 81 at pinch points 100. Decreased values for squeeze 133 result in more pressure being applied to product 43 as it passed through pinch points 100 than is applied in whole nut blanching mode.

To operate nut blancher 21 in whole nut blanching mode, squeeze 133 is set to a larger value than is used for operating in split nut blanching mode for a particular size and preconditioning of product 43. Blancher 21 can operate in whole nut blanching mode to process 2,000 pounds of peanuts per hour, with up to an 80 to 90 percent yield of acceptable product, depending upon nut sizes and proper preconditioning of product.

The preferred embodiment of the present invention offers several advantages over prior art nut blanchers. Since soft rubber is used rather than abrasive materials, fines are essentially eliminated. Thus the weight, or yield, of product passing through a nut blancher of the present invention is not reduced by scraping nut meat material therefrom. Additionally, the surface of nut meats are not scraped away, or abraded, and have a better appearance and absorb less oil when cooked. Further, the resilient, or rubberlike, surfaces of the rollers of the present invention extend the wear life of the roller assemblies according to the present invention over roller assemblies having rollers made from harder materials.

A nut blancher according to the present invention can be adjusted to change the squeeze between rollers for processing different sizes of nuts, without changing out rollers. Higher yield rates of acceptable nuts are achieved over a wide range of nut sizes since the nut blancher of the present invention not only provides a means for gently processing nuts, but also adjustment means for repeatably controlling process parameters, such as the speed of the rollers and the squeeze between the rollers.

The present invention is operable in either a whole nut blanching mode or a split nut blanching mode. In whole nut blanching mode, a higher yield of whole nuts is achieved since the gentler process and high degree of repeatable control results in less nuts being split when passing through the nut blancher made and operated according to the present invention.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

I claim:

1. In an apparatus for blanching nuts having a nut feeder for receiving the nuts after the nuts are preconditioned for blanching and presenting the nuts to a roller assembly, the roller assembly including a lower and upper cylindrical rollers which are supported within a frame for rotating on substantially parallel shafts, a motive means for rotating the lower and upper rollers to pass the nuts through pinch points defined between the lower and upper cylindrical rollers, and a discharge means for directing the nuts from the roller assembly, an improvement comprising:

a first member having an exterior with a resilient surface which continuously extends around the lower cylindrical roller, the resilient surface having grooves formed therein in a parallel feed alignment to define groove crests and roots which alternate over the resilient surface, the grooves in the resilient surface disposed for accepting nuts from the nut feeder and transporting the nuts through the pinch points between the lower and upper rollers;

a second member continuously extending around the upper cylindrical roller and having resilient ribs extending therefrom to define crests which extend over the second member in the parallel feed alignment of the grooves in the resilient surface, the crests of the resilient ribs disposed for radially aligning with the roots of the grooves in the resilient surface at the pinch points between the lower and upper cylindrical rollers;

wherein the lower cylindrical roller is rotated for moving the resilient surface along the nut feeder to receive the nuts within the roots of the grooves for holding and transporting the nuts through the pinch points between the lower and upper cylindrical rollers; and wherein the upper cylindrical roller is rotated for passing the resilient ribs radially across the roots of the grooves of the resilient surface to wipe the crests of the resilient ribs across the nuts passing through the pinch points for breaking skins on the nuts.

2. The improvement of claim 1, wherein the first member is bonded to the lower cylindrical roller for providing the lower cylindrical roller with the resilient surface having grooves exteriorly formed therein.

3. The improvement of claim 1, wherein the second member is bonded to the upper cylindrical roller for providing an exterior surface of the upper cylindrical roller from which the resilient ribs exteriorly extend.

4. The improvement of claim 1, wherein the resilient surface and the resilient ribs have hardness values which substantially measure between 24 and 50 durometer.

5. The improvement of claim 1, wherein the resilient surface and the resilient ribs have hardness values which measure about 30 durometer.

6. The improvement of claim 1, wherein the nut feeder further comprises:

alignment means for orienting splits in the nuts orthogonal to outer circumferences of the lower and upper cylindrical rollers for passing through the pinch points.

7. The improvement of claim 6, wherein the lower and upper cylindrical rollers rotate in counter directions to move the first member and the second member in the same linear direction at the pinch points.

8. The improvement of claim 7, wherein the frame further comprises:

adjustment means for selecting a squeeze between the grooves of the resilient surface of the first member and the resilient ribs of the second member at the pinch points, the squeeze selected for adjusting the roller assembly to accommodate a particular range of nut sizes; and measurement means for repeatably determining the squeeze selected at the pinch points between the grooves in the resilient surface of the first member and the resilient ribs of the second member.

9. The improvement of claim 1, further comprising:

an elastomeric material vulcanized onto the lower and upper cylindrical rollers to form the first member and second member, the elastomeric material having hardness values which substantially measure between 24 and 50 durometer;

the nut feeder further including alignment means for orienting splits in the nuts orthogonal to outer circumferences of the lower and upper cylindrical rollers for passing through the pinch points; and the motive means rotating the lower and upper cylindrical rollers in counter directions to move the first member and the second member in the same linear direction at the pinch points.

10. The improvement of claim 9, wherein the elastomeric material vulcanized onto the lower and upper cylindrical rollers has hardness values which measure about 30 durometer.

11. An apparatus for blanching nuts which have been preconditioned for blanching, the apparatus comprising:

feed means for receiving nuts from a feed inlet, orienting the nuts in a parallel feed alignment, and transporting the nuts through a grooved feed tray;

a lower cylindrical roller having a lower central axis and a resilient exterior surface into which lower roller teeth are formed by grooves which circumferentially extend about the lower central axis, the grooves disposed in the parallel feed alignment to define groove crests and roots which alternate laterally across the resilient exterior surface, and the grooves sized for retaining the nuts relative to the resilient exterior surface during transport about the lower central axis;

an upper cylindrical roller having an upper central axis and upper roller teeth exteriorly formed therein to provide a ribbed exterior surface from which resilient ribs circumferentially extend about the upper central axis, the resilient ribs being spaced apart in the parallel feed alignment to define crests and rib roots which alternate laterally across the upper cylindrical roller;

a frame for supporting the lower and upper cylindrical rollers with the lower central axis parallel to the upper central axis, and for radially aligning the crests of the resilient ribs on the upper cylindrical roller with the roots of the grooves in resilient exterior surface of the lower cylindrical roller at pinch points defined between the lower and upper cylindrical rollers;

motive means for counter-rotating the lower and upper cylindrical rollers, wherein rotating the lower cylindrical roller moves the grooves in the resilient exterior surface past the feed means and the nuts are received into the roots of the grooves for transporting about the lower central axis, and wherein rotating the upper cylindrical roller wipes the crests of the resilient ribs across the nuts which are retained within the grooves in the lower cylindrical roller and thus breaks the skin on the nuts; and discharge means for directing the nuts from the grooves in the lower cylindrical roller and to an apparatus discharge.

12. The apparatus of claim 11, wherein the feed means further disposes splits in the nuts orthogonal the resilient exterior surface of the lower cylindrical roller for passing through the pinch points orthogonal to the ribbed exterior surface of the upper cylindrical roller.

13. The apparatus of claim 12, wherein the resilient exterior surface of the lower cylindrical roller and the resilient ribs of the upper cylindrical roller have hardness values which substantially measure between 24 and 50 durometer.

14. The apparatus of claim 12, wherein the frame further comprises:

adjustment means for selecting a squeeze between the lower cylindrical roller and the upper cylindrical roller at the pinch points for accommodating a particular range of nut sizes; and measurement means for repeatably determining the squeeze at the pinch points between the lower cylindrical roller and the upper cylindrical roller.

15. The apparatus of claim 14, wherein the resilient ribs of the upper cylindrical roller pass into the roots of the grooves in the resilient surface of the lower cylindrical member when the adjustment means is operated to adjust the squeeze between the lower cylindrical roller and the upper cylindrical roller for accommodating small nuts.

16. The apparatus of claim 14, wherein the apparatus is operated in split nut blanching mode by reducing the squeeze to a lower value than a value used for operating the apparatus in whole nut blanching mode, and by increasing the rotational speed of the upper cylindrical roller to a higher value than a speed value used for operating the apparatus in whole nut blanching mode.

17. The apparatus of claim 11, wherein the resilient exterior surface of the lower cylindrical member and the resilient ribs of the upper cylindrical member are formed from elastomeric materials which are vulcanized onto the lower and upper cylindrical roller and have harnesses which measure about 30 durometer.

18. The apparatus of claim 17, wherein the lower cylindrical roller rotates at a speed of approximately 9 revolutions per minute and the upper cylindrical roller rotates at a speed of approximately 12 revolutions per minute.

19. A method for operating an apparatus for blanching nuts which have been dried to loosen skins on the nuts, the method comprising the steps of:

providing an apparatus having an upper roller with wiping ribs, a lower roller with parallel grooves, a feed means, a frame for securing the upper roller with respect to the lower roller, and a motive means for rotating the upper roller and the lower roller;

passing nuts through the feed means to orient the nuts in a parallel feed alignment for feeding into the parallel grooves in an elastomeric surface of the lower roller, with splits in the nuts disposed orthogonal to circumferences extending around the elastomeric surface;

rotating the lower roller about a central axis for passing the parallel grooves past the oriented nuts in the parallel feed alignment to feed the nuts into the parallel grooves in the elastomeric surface of the lower roller with the splits disposed orthogonal to the circumferences which extend around the elastomeric surface of the lower roller;

further rotating the lower roller about the central axis for moving the nuts in the grooves through pinch points defined between the lower roller and the upper roller;

rotating the upper roller so that the wiping ribs wipe across the nuts at the pinch points to break the skins on the nuts, wherein the wiping ribs define crests which are radially aligned with roots defined by the grooves of the lower roller, which are holding the nuts within the lower roller at the pinch points;

removing the nuts from the grooves;

removing loose skins from the nuts; and transporting the nuts to external processing equipment.

20. The method of claim 19, wherein the motive means counter-rotates the lower and upper rollers in substantially a same linear direction of travel at the pinch point and with different linear velocities at the pinch points.

21. The method of claim 20, further comprising the steps of:

prior to blanching a particular range of nut sizes, moving the lower and upper rollers within the frame to adjust the squeeze between the lower and the upper rollers to touch the upper roller against the lower roller;

adjusting a squeeze measurement means to find define a zero point; and adjusting the squeeze between the lower and upper roller to determine a predetermined reading on the squeeze measurement means, at which the squeeze between the upper and lower rollers will be properly set for blanching the particular range of nut sizes.

* * * * *